United States Patent [19]

Glett et al.

[11] Patent Number: 4,636,679
[45] Date of Patent: Jan. 13, 1987

[54] PIEZOELECTRICALLY DRIVEN FAST RESPONSE HIGH-TORQUE CLUTCH UNIT

[75] Inventors: Bryan L. Glett, Bellefontaine, Ohio; Mark A. Murphy, South Bend, Ind.

[73] Assignee: The United States of America as represented by the Secretary of the Air Force, Washington, D.C.

[21] Appl. No.: 818,923

[22] Filed: Jan. 15, 1986

[51] Int. Cl.$^4$ ............................................. H01L 41/08
[52] U.S. Cl. ................................. 310/328; 192/30 R; 192/53 R; 192/57
[58] Field of Search ........... 310/328; 192/30 R, 53 R, 192/53 A, 53 C, 53 D, 55, 57, 65, 84 R, 85 R, 90; 74/111, 144, 148, 160, 162, 163

[56] References Cited

U.S. PATENT DOCUMENTS

| | | | |
|---|---|---|---|
| 3,154,700 | 10/1964 | McNaney | 310/328 |
| 3,217,218 | 11/1965 | Steele | 310/328 X |
| 3,292,019 | 12/1966 | Hsu et al. | 310/328 |
| 3,902,085 | 8/1975 | Bizzigotti | 310/8.3 |
| 4,032,804 | 6/1977 | Wagner | 310/8.3 |
| 4,382,202 | 5/1983 | Herchenbach | 310/328 |
| 4,431,934 | 2/1984 | Kleinschmidt et al. | 310/331 |
| 4,438,363 | 3/1984 | Babitzka et al. | 310/328 |
| 4,468,583 | 8/1984 | Mori | 310/328 |

*Primary Examiner*—Mark O. Budd
*Attorney, Agent, or Firm*—William G. Auton; Donald J. Singer

[57] ABSTRACT

The coupling of driving shaft with a driven shaft is accomplished at high torques and high speeds of rotation using a piezoelectric shack, a passive clutch system, and a hydraulic clutch activation system. The piezoelectric stack is housed in the rotating driving shaft, and extends along the axis of the shaft when it receives an engagement signal. This extension of the piezoelectric stack depresses a disk spring into the hydraulic cavity of the housing of the hydraulic clutch activation system. The pressure thereby generated in the hydraulic fluid compresses a compression ring onto a control disk and translates any rotation of the compression ring into the control disk. A torsion rod in the center axis of the control disk is rotated and, in turn, rotates a plug connected to a sprag clutch. This rotation serves to rotate the sprags into a locking position so that the sprag clutch engages the driving shaft with the driven shaft.

4 Claims, 2 Drawing Figures

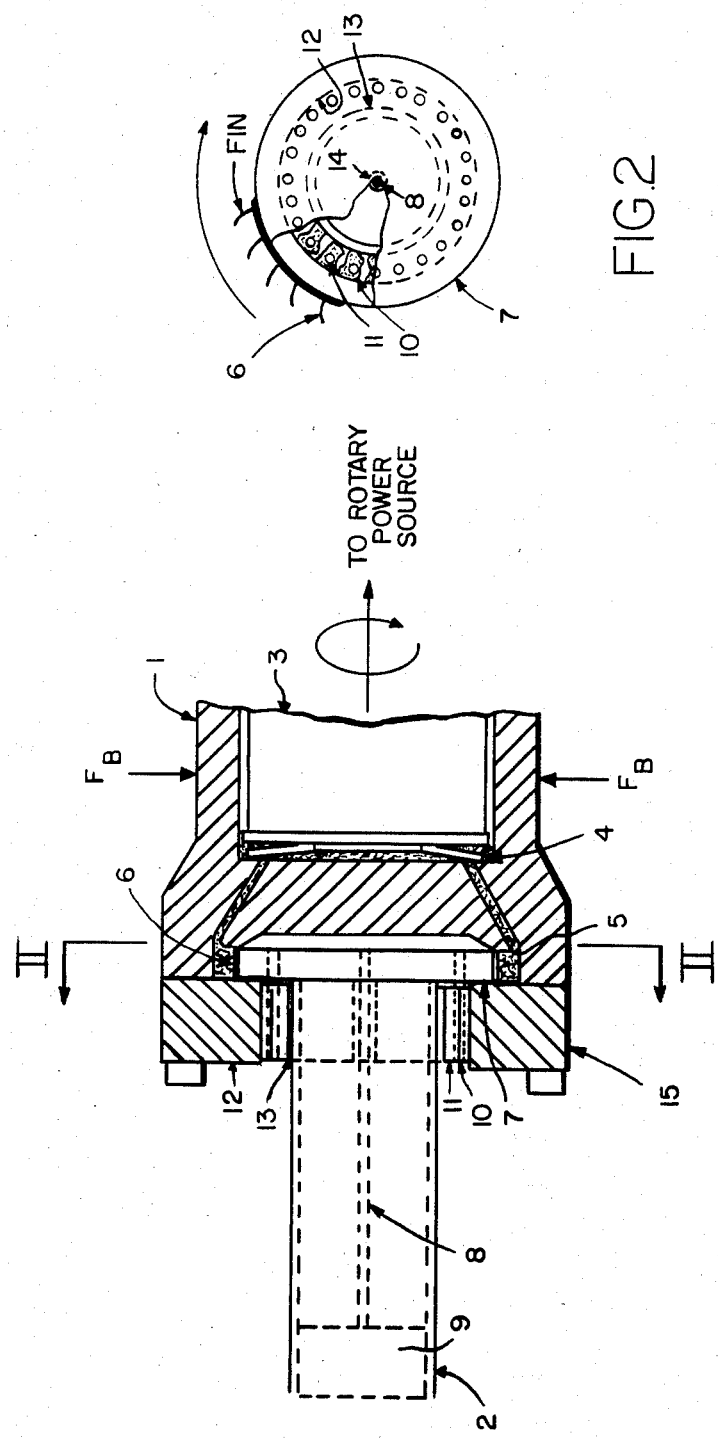

PIEZOELECTRICALLY DRIVEN FAST RESPONSE HIGH-TORQUE CLUTCH UNIT

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to mechanical clutch systems which couple rotating shafts, and more particularly to the application of piezoelectric elements to rotary clutch systems.

The piezoelectric stack is an actuator used in many types of high-speed devices. This stack will extend or retract a small amount according to the voltage placed on its many separate plates of piezoelectric material. Its response is very fast, on the order of 100 microseconds to full extension or retraction. The second basic device is an adaptation of the sprag clutch, a familiar type of overrunning clutch.

Basically, the "piezostack" is capable of very fast response at high force, but the amount of displacement is so small as to render it unusable for a direct-clutch application; its elastic modulus when fully extended is not enough to support frictional forces high enough to transmit large forces quickly. Its extensions may be compounded in a pumping fashion to increase its displacement hydraulically, but this defeats much of the high speed advantage of the device.

The sprag clutch is a "passive" clutch, capable of engaging when the input shaft is rotating faster than the output shaft, and disengaging when the output shaft is turning faster than the input (i.e., overrunning it). For this reason it is known as an overrunning clutch. This clutch is very useful for certain types of high-torque applications, such as roll drives and motor starters. It is only controllable by the input or output shafts, accelerated or decelerated by conventional means. For high-torque power sources, this means overcoming a great deal of inertia, slowing the response time markedly.

A system which combines the piezoelectric stack with, clutch systems, such as the sprag clutch, would combine the fast response characteristics of piezoelectric elements with the high-torque engagement capabilities of the conventional clutch.

The task of applying a linear piezoelectric stack to activate a sprag clutch to achieve shaft coupling at high speeds and high torques is alleviated, to some extent, by U.S. Pat. No. 4,468,583 issued to Kenji Mori on Aug, 28, 1984, the disclosure of which is incorporated by reference. The Mori reference discloses a rotating actuator for converting electrical energy into rotating torque which includes annular piezoelectric elements alternately energized to continuously rotate a rotor.

While the device of the Mori reference is exemplary in the art, the use of such annular piezoelectric elements is described in Mori as generating a large torque at low rotation speeds. From the foregoing discussion, it is apparent that there currently exists the need to achieve shaft coupling at high speeds (3,000–25,000 rpm), as well as high torques. The present invention is intended to satisfy that need.

SUMMARY OF THE INVENTION

The present invention is a fast response high-torque clutch unit. In order to provide a system of coupling rotating shafts that has a fast response and is capable of operating a rotating shaft that has high-torque and high speed, the present invention uses: a linear piezoelectric stack, a sprag clutch, and a hydraulic clutch activation unit.

The piezoelectric stack is a linear piezoelectric element which extends or retracts a small amount according to the voltage placed upon it. In the present invention, the piezoelectric stack is housed in the rotating housing of the driving shaft, and when it receives an engagement signal, it expands linearly along the axis of the shaft. This expansion impacts against the hydraulic clutch activation system which, in turn causes the sprag clutch to couple the driven shaft to the driving shaft, as described below.

The hydraulic clutch activation unit includes: a hydraulic cavity filled with hydraulic fluid, a pressure disk and disk spring, slip rings, a thin compression ring, a shaft end cap, a control disk, a torsion rod, a plug and a bearing. The slip ring couples the piezoelectric stack with the pressure disk.

This pressure disk is adjacent to the hydraulic cavity and is normally pressed outwards by the disk spring. As an engagement signal is received, the piezoelectric stack in the driving shaft presses the pressure disk into the hydraulic cavity to create pressure in the hydraulic fluid. This pressure is conducted by the hydraulic fluid to compress the then annular compression ring over the control disk.

The control disk develops an interference fit as the compression ring compresses inwardly. This control disk is mounted on the end of the torsion rod which extends into the spring clutch and the driven shaft. As the rotating compression ring compresses inwardly it translates some of the rotary motion of the driving shaft into the control disk which, in turn rotates the torsion rod.

The spring wheel of the sprag clutch is mounted upon the torsion rod. The rotary motion of the torsion rod causes the sprags to rotate to a position where they engage and lock together the driving shaft with the driven shaft.

It is a principal object of the present invention to provide a clutch system which has a fast response.

It is another object of the present invention to provide a clutch system which couples a drive shaft to a rotating driving shaft at high rotating speeds (3,000–25,000 rpm) and high torques.

It is another object of the present invention to control a large torque with a comparatively small engagement signal.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIG. 1 is an illustration of an embodiment of the present invention; and,

FIG. 2 is a detailed end view of the sprag clutch system used in FIG. 1.

DETAILED DESCRIPTION OF THE PREFERRED EMBODIMENT

The present invention is a system which achieves mechanical rotational shaft coupling at high speeds and high torques using a piezoelectric stack and a sprag clutch.

The reader's attention is now directed towards FIG. 1, which is an illustration of an embodiment of the present invention. This invention couples a driving shaft or clutch input shaft (1) with a driven shaft or clutch output shaft (2) using: the piezoelectric stack (3), a hydraulic clutch activation system to activate a sprag clutch.

The clutch input shaft (1) is rotating at its steady-state speed, somewhere between approximately 3,000 and 25,000 rpm, for proper operation. This shaft is driven up to speed in advance of anticipated engagement of the clutch. Therefor, acceleration of the power source (e.g., a large motor armature) ceases to become a factor in the response. Incorporated within the clutch end of this input shaft is: a piezostack (3), coupled through suitable slip rings; a hydraulic cavity; and a thin compression ring (6) retained by a shaft-end cap (12).

Upon a suitable signal to the piezostack (1), which is in a retracted position, begins to expand with great force (approximately 5,000 psi maximum), working against the disk (Belleville) spring (4), and the hydraulic fluid in the cavity (5). This fluid flows as a pressure wave through several machined slots, from the piezostack cavity, into the ring cavity (5). This fluid flows as a pressure wave begins to exert a force on the thin phosphor-bronze compression ring (6), causing it to compress. This ring is so designed that it may compress inwardly for approximately 0.003 inch diameter without experiencing buckling. It will be noted at this point that piezostack, hydraulic fluid, and ring (6) are all rotating at the speed of the input shaft at this time. Note too that the compression ring's (6) periphery has many fins on it to assure that much of the kinetic energy of the fluid may be imparted to the ring, if the ring's velocity changes in relation to the fluid.

The compression ring (6) is closely sized on its inner surface, to have a close running fit over the outer surface of the control disk (7), which is the first element of the output, in this clutch system. As the ring (6) shrinks elastically due to the hydraulic pressure, the close running fit tightens to a slight interference fit over the control disk (7), coupling it to the ring. Since the control disk (7) is stationary at this time, it tries to slow the compression ring (6), but the viscous coupling to the hydraulic fluid attempts to keep the ring in motion. The net effect is to apply a small but significant torque to the control disk (7).

The control disk (7) is mounted at the end of a relatively slender torsion rod (8). This rod is so sized that the torque applied by the input shaft on the control ring causes it to twist slightly as the torque is applied. The torsion rod (8) is anchored in the output shaft by a plug (9) set into the shaft, and a bearing at the end of the shaft (14) supports the rod (8) at the control disk end, maintaining the precise centering needed to maintain the close running for at the ring/disk interface, as previously described.

As the control disk (7) twists slightly, it causes the gang of sprags (11) to rotate into a position where they can grab the inner surface of the cap (12), and the output shaft surface (13).

This would be their normal position to grab if they were in a conventional sprag clutch. They are held away from this position by the pins (10) which couple them to the control disk, and a slight depression in the output shaft surface (13) which maintains their relative location. Rotation of the control disk, however, allows them to rotate slightly into their normal grabbing position, where they then cam into a very firm grip between the input shaft surface (12) and the output shaft surface (13). One might restate this by saying the sprags are now in their drive position, where they were previously held slightly rotated past their overrunning position by the control disk, which kept them from their natural engagement.

At this point, the full torque of the input shaft is coupled to the output shaft by these sprags, and a very positive and firm engagement is had, at full input shaft speed. The engagement should be slightly smoother than a typical "trip-type" mechanical clutch (e.g., a punch press mechanical clutch), owing to the smooth torque increase as the sprags came in. Still, however, the actuation should be very fast due to the fast actuation time of the piezostack.

At engagement, there will naturally be a dropoff in the input shaft speed due to loading. At some point, however fast, there will be a restoration to steady-state speed, for both the input shaft and the output shaft coupled together. This leads us to conditions for disengagement of the clutch.

FIG. 2 is a detailed illustration of the sprag clutch of FIG. 1. The clutch may be disengaged in two ways. If the load on the shaft is light enough at the steady-state speed, the torsion rod (8) will exert enough reaction torque to twist the output shaft back into a sprags-disengaged position, as at the start, as the control disk (7) comes back into its original relationship with the output shaft angular position. If the load is heavy on the output shaft, even after steady-state speed is reached, the clutch may be disengaged by braking the input shaft slightly. This would of course be accompanied by removal of the piezostack signal. This slight braking would cause the inertia of the load to overrun the input shaft, disengaging the clutch and restoring initial ring-/disk/output shaft relationships. Of course disengagement could also be had by decoupling the output shaft from the load by another means, such as a crude tooth clutch.

Note that in constructing the unit, the input shaft cap (15) is drawn up over the hydraulic cavity (5) and the ring. This is to form a tight, leak-free interference fit that will be overcome by the hydraulic pressure, and restoring pressure of the compression ring (6). The sprags are of conventional design, with the exception of a slight modification to allow their rolling out of the way, and the pin-holes for controlling their rocking. The piezostack is a monolithic stack of many individually-machined plates of material (e.g., Channell Industries #5400), although a technique may exist for achieving similar action from a homogeneous single-piece unit of recent design. The "Belleville", or spring washer serves to preload out any looseness in the stack, for cleanest response. It may be expected that a total stack travel of 0.003" can be obtained, at 4,000 psi.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A fast response high-torque clutch system which couples a driving shaft, which is rotating at high speeds, with a driven shaft, said fast response high-torque clutch system comprising:
   a passive clutch which is connected to the driven shaft and engages the driven shaft with the driving shaft when said passive clutch is rotated;
   a piezoelectric stack which is housed in said driving shaft, said piezoelectric stack extending with a fast response when receiving an engagement signal and retracting when said engagement signal is removed; and
   a means for activating said passive clutch, said activating means being connected to said piezoelectric stack and rotating said passive clutch in response to said engagement signal, said activating means thereby enabling said driving shaft to be engaged by said passive clutch at a high torque with the driven shaft at high speeds with a fast response.

2. A fast response high-torque clutch system, as defined in claim 1, wherein said activating means comprises:
   a housing having a hydraulic cavity filled with hydraulic fluid, said housing being connected to said driving shaft in proximity to said piezoelectric stack;
   a disk spring positioned between said housing and said piezoelectric stack, said disk spring being displaced into said hydraulic cavity when said piezoelectric stack extends, said disk spring thereby placing pressure on said hydraulic fluid in said hydraulic cavity;
   a compression ring which is mounted in said housing and surrounded by said hydraulic cavity, said compression ring being compressed by said hydraulic fluid when said disk spring is displaced into said hydraulic cavity, said compression ring also being rotated by rotation of the driving shaft when the compression ring is compressed;
   a means for rotating said passive clutch, said rotating means being connected to said passive clutch and becoming engaged in an interference fit with said compression ring when it compresses, said rotating means thereby being rotated by any rotation of said compression ring, said rotating means in turn rotating said passive clutch to cause it to engage said driving shaft with said driven shaft.

3. A fast response high-torque clutch system, as defined in claim 2, wherein said rotating means comprises:
   a control disk which is positioned within the compression ring so that it develops an interference fit with the compression ring when it compresses inwardly, said control disk thereby being rotated by any rotation of said compression ring;
   a torsion rod which is connected to said control disk at its center axis and is rotated by any rotation of said control disk; and
   a plug anchors the torsion rod to the passive clutch in the driven shaft so that it rotates the passive clutch when the control disk rotates, said plug and torsion rod thereby enables the passive clutch to engage the driving shaft with the driven shaft.

4. A fast response high-torque clutch system, as defined in claim 3, wherein said passive clutch is a sprag clutch which is connected to said driven shaft and said rotating means, said sprag clutch having a plurality of sprags which are normally disengaged, but said plurality of sprags being capable of being rotated into position where they can engage an inner surface of said driving shaft when the sprag clutch is rotated by said rotating means, said sprag clutch thereby engaging said driving shaft with said driven shaft in a direct response to said engagement signal in said piezoelectric stack.

* * * * *